3,429,938
PROCESS FOR THE PRODUCTION OF
IODOFLUOROALKANES
Louis Foulletier, Lyon, France, assignor to Ugine Kuhlmann, Paris, France, a French company
No Drawing. Filed Mar. 28, 1967, Ser. No. 626,393
Claims priority, application France, Mar. 29, 1966, 55,307
U.S. Cl. 260—653.9          10 Claims
Int. Cl. C07c 19/08, 21/18

ABSTRACT OF THE DISCLOSURE

An iodofluoroalkane is prepared by introducing about equal molar amounts of elemental iodine and fluorine into a reaction vessel to form a halogenating agent and thereafter reacting with a halogenated alkene containing 2 or 3 carbon atoms in the presence of arsenic or an arsenic halide. The amount of arsenic catalyst used is equivalent to at least 0.001 mole of arsenic per mole of elemental fluorine introduced into the vessel. The iodofluoroalkane thus produced is characterized by having equal molar amounts of iodine and fluorine added to the alpha and beta positions of its unsaturated precursor.

BACKGROUND OF THE INVENTION

Field of the invention

This invention relates to a process for preparing iodofluoroalkanes by iodo-fluorinating a halogenated lower alkene in the presence of an arsenic catalyst.

Description of the prior art

Iodofluoroalkanes have been prepared by reacting certain monohalo derivatives of iodine to fluorinated alkenes. For example, 1 - chloro - 2 - iodo-tetrafluoroethane has been prepared by an addition reaction of iodine monochloride and tetrafluoroethylene. In the prior processes, the simultaneous addition of one atom of iodine and one atom of flourine to a halogenated alkene required the use of a mixture of iodine and iodine pentafluoride as halogenating agents. Catalysts such as antimony pentafluoride, antimony trifluoride, anhydrous stannous fluoride and aluminum and its salts such as aluminum iodide, were generally used to pomote the reaction. These types of processes are not completely satisfactory because they involve the production of $IF_5$ and the yields were poor unless hard to handle antimony catalysts were used.

SUMMARY OF THE INVENTION

I have discovered that iodofluoroalkanes can be produced with exceptionally high yield according to the process of this invention. Broadly stated the process comprises introducing elemental iodine and fluorine into a reaction zone to form a halogenating agent, the molar amount of one element being less than about twice the molar amount of the other and thereafter reacting in the reaction zone with a halogenated alkene containing 2 or 3 carbon atoms with the halogenating agent in the presence of arsenic or an arsenic halide in an amount equivalent to at least about 0.001 mole of arsenic per mole of elemental fluorine introduced into the reaction zone. The iodofluoroalkane is recovered from the reaction zone and it is characterized by having equal molar amounts of iodine and fluorine added to the alpha and beta positions of its unsaturated precursor.

The iodofluoroalkanes produced according to the present invention may be used directly without further purification as telogens for the production of telomers according to the known processes, such as thermic telomerization, telomerization catalyzed by peroxides or by an actinic radiation. The iodofluoroalkane derived from tetrafluoroethylene, for example, can be used to produce perfluoroiodoalkanes of the formula

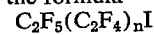

by telomerization with tetrafluoroethylene. The perfluoroiodoalkanes are important raw materials for providing perfluorocarbonaceous molecules carrying chemical functional groups.

DESCRIPTION OF THE PREFERRED EMBODIMENTS

In the present process the first stage of the reaction involves the formation of the halogenating agent by introducing elemental iodine and fluorine into a reaction vessel. The fluorine to iodine molar ratio may vary within the range between 1/2 and 2/1. It is preferred that about equal molar amounts of fluorine and iodine are used to form the halogenating agent. The preferred range of the molar ratio of fluorine to iodine, therefore, is between 1/0.95 and 1.05/1.

The exact nature of the halogenating agent is not completely known. It may be in the form of a mixture of elemental iodine and fluorine, or it may be in the form of one or more compounds of iodine and fluorine whose exact chemical structures are not yet completely understood. In fact, the halogenating agent may be a mixture of both forms.

The temperature for forming the halogenating agent is not critical and can be varied within a wide range such as between —80° and 250° C. For practical reasons, however, the addition of iodine and fluorine is preferably carried out at a temperature in the range between 0° and 150° C.

The arsenic catalyst may be added to the reaction vessel at this time. For convenience, it is generally added to the reaction vessel prior to the introduction of elemental iodine and fluorine. The catalyst, as stated hereinabove, can be elemental arsenic or it may be in the form of a halide such as arsenic fluoride, arsenic bromide, arsenic chloride and arsenic iodide. The amount of catalyst to be used is generally measured by the amount of fluorine introduced into the reaction vessel. I found as $As/F_2$ molar ratio in the range between about 0.2 and about 0.001 to be suitable, although the upper limit of 0.2 is not critical.

Subsequent to the formation of the halogenating agent and the addition of the catalyst, the halogenated lower alkene is then fed gradually into the reaction vessel. The suitable halogenated lower alkenes contain 2 and 3 carbon atoms. Among them the alkenes having the following formulas were found to be eminently suitable.

(A)  $CF_2=CF_2$
(B)  $CF_2=CFCl$
(C)  $CF_2=CH_2$
(D)  $CH_2=CHF$
(E)  $CF_3-CF=CF_2$

At low pressure the second stage of the reaction proceeds slowly. It is, therefore, advantageous to carry out this stage of the reaction under moderate pressure. The range of pressure that can be used depends on other operating conditions and particularly on the halogenated alkene used. For example, a pressure in the range between 5 and 20 kgs./cm.² is suitable for the production of $C_2F_5I$ using tetrafluoroethylene. For alkenes of the formulas identified hereinabove as (B), (C), (D), and (E), the pressure may be in the range between 1 and 30 kgs./cm.².

The reaction involves the addition of equal molar amounts of iodine and fluorine in the alpha and beta positions of the alkene and the yield is practically quantitative. In view of the relative reactivities of iodine and fluorine, and the liability of the IF formation, the result of this invention is completely unexpected. There does not appear to be any explanation why the process according to the present invention provides a precise addition of one iodine atom and one fluorine atom on the double bond of the alkene. If the process were to follow a normal mode of action, one would expect a preponderant addition of fluorine atoms in the alkene or a violent reaction of fluorine with the ethylene molecules to form perfluoroalkanes.

I found the second stage of the present process will take place within a wide temperature limit of between −25° and 150° C. It is, however, preferably carried out in a temperature between 25 and 100° C. The amount of halogenated alkene to be used is about the stoichiometric amount. It does not appear to have any beneficial or adverse effect if more or less amounts of alkene is used since the reaction is practically quantitative. The process, however, is preferably conducted in a fluorine resistant vessel such as special steel, nickel, and nickel alloys.

Further to illustrate this invention specific examples are described hereinbelow.

Example I

A nickel autoclave of 250 cm.$^3$ was charged with 1 g. of arsenic powder and 0.25 mole of iodine, thereafter 0.25 mole of fluorine was fed progressively into the autoclave while keeping the temperature at approximately 60–70° C. When all the fluorine had been introduced, 0.5 mole of tetrafluoroethylene was added progressively and the temperature was maintained at approximately 70° C. and the pressure between 10 and 15 kgs./cm.$^2$.

At the end of the reaction, 0.48 mole of $C_2F_5I$ was obtained. 0.02 mole of $C_2F_4$ was unconverted. The yield based on the fluorine and $C_2F_4$ used reached 96%.

Example II

Example I was reproduced with the exception that 0.1 g. of arsenic was used. The yield amounted to 92%.

Example III

Example I was reproduced, with the exception that less than 0.01 g. of arsenic was used. An extremely violent reaction was observed at the instant of addition of $C_2F_4$, resulting in fracture of the "bursting plate" incorporated in the autoclave to prevent the bursting of the latter.

Example IV

Example I was reproduced except no arsenic was used. In this example, the tetrafluoroethylene was introduced very slowly in order to prevent an explosive reaction; the yield amounted to no more than 50%.

Example V

Example I was reproduced except the arsenic was replaced by 1 g. of aluminum powder degreased with trichlorotrifluoroethane. The yield amounted to approximately 48%, and the presence of traces of $CF_4$ was noted in the reaction products.

I claim:
1. A process for preparing an iodofluoroalkane which comprises introducing elemental iodine and fluorine into a reaction zone to form a halogenated agent, the fluorine to iodine molar ratio being within the range of 1/2 to 2/1, thereafter reacting in the reaction zone a halogenated alkene containing 2 or 3 carbon atoms with the halogenating agent in the presence of arsenic or an arsenic halide in an amount equivalent to at least about 0.001 mole of arsenic per mole of elemental fluorine introduced into the reaction zone, and recovering therefrom the iodofluoroalkane characterized by having equal molar amounts of iodine and fluorine added to the alpha and beta position of its unsaturated precursor.

2. A process according to claim 1 wherein the halogenated alkene is tetrafluoroethylene and the process is carried out at a pressure in the range between 5 and 25 kgs./cm.$^2$.

3. A process according to claim 1 wherein the halogenated alkene has the formula $CF_2=CFCl$, and the process is carried out at a pressure in the range between 1 and 30 kgs./cm.$^2$.

4. A process according to claim 1 wherein the halogenated alkene has the formula $CF_2=CH_2$, and the process is carried out at a pressure in the range between 1 and 30 kgs./cm.$^2$.

5. A process according to claim 1 wherein the halogenated alkene has the formula $CH_2=CHF$, and the process is carried out at a pressure in the range between 1 and 30 kgs./cm.$^2$.

6. A process according to claim 1 wherein the halogenated alkene has the formula $CF_3-CF=CF_2$ and the process is carried out at a pressure in the range between 1 and 30 kgs./cm.$^2$.

7. A process according to claim 1 wherein the molar amount of fluorine and iodine introduced in the reaction is about equal and the halogenated alkene is tetrafluoroethylene.

8. A process according to claim 7 wherein the process is carried out in the presence of arsenic and the amount used is less than 0.2 mole of As per mole of elemental fluorine used.

9. A process for preparing an iodofluoroalkane of the formula $C_2F_5I$ which comprises introducing equal molar amounts of elemental iodine and fluorine into a reaction zone to form a halogenating agent, adding thereto about 0.2 to 0.001 mole of arsenic per mole of elemental fluorine, feeding gradually into the reaction zone tetrafluoroethylene into the reaction zone under a pressure between 5 and 25 kgs./cm.$^2$ until substantially all the halogenating agent is consumed, and recovering the $C_2F_5I$ therefrom.

10. A process according to claim 9 wherein the pressure in the reaction zone is between 10 and 15 kgs./cm.$^2$. The temperature for the reaction is between 60° and 70° C.

References Cited

UNITED STATES PATENTS

| | | | |
|---|---|---|---|
| 2,549,988 | 4/1951 | Perkins | 260—653.8 |
| 3,132,185 | 5/1964 | Parsons | 260—653.1 |
| 3,006,973 | 10/1961 | Hauptschein et al. | 260—653.1 |

DANIEL D. HORWITZ, *Primary Examiner.*